(12) United States Patent
Cai et al.

(10) Patent No.: US 12,013,286 B2
(45) Date of Patent: Jun. 18, 2024

(54) RAMAN SPECTROSCOPY PROBE AND RAMAN SPECTROSCOPY DETECTION DEVICE

(71) Applicant: NANJING NUOYUAN MEDICAL DEVICES CO., LTD., Jiangsu (CN)

(72) Inventors: Huiming Cai, Jiangsu (CN); Ziyang Wang, Jiangsu (CN)

(73) Assignee: NANJING NUOYUAN MEDICAL DEVICES CO., LTD., Jiangsu (CN)

( * ) Notice: Subject to any disclaimer, the term of this patent is extended or adjusted under 35 U.S.C. 154(b) by 0 days.

(21) Appl. No.: 18/548,032

(22) PCT Filed: Feb. 22, 2023

(86) PCT No.: PCT/CN2023/077735
§ 371 (c)(1),
(2) Date: Aug. 25, 2023

(87) PCT Pub. No.: WO2023/241090
PCT Pub. Date: Dec. 21, 2023

(65) Prior Publication Data
US 2024/0044708 A1 Feb. 8, 2024

(51) Int. Cl.
*G01J 3/44* (2006.01)
*G01J 3/02* (2006.01)

(52) U.S. Cl.
CPC ............... *G01J 3/44* (2013.01); *G01J 3/0208* (2013.01); *G01J 3/0218* (2013.01)

(58) Field of Classification Search
CPC .......... G01J 3/0208; G01J 3/0218; G01J 3/44
See application file for complete search history.

(56) References Cited

U.S. PATENT DOCUMENTS

| 5,534,997 A | 7/1996 | Schrader |
| 5,644,396 A | 7/1997 | Hopkins, II |
| (Continued) | | |

FOREIGN PATENT DOCUMENTS

| CN | 101672973 A | 3/2010 |
| CN | 102519937 A | 6/2012 |
| (Continued) | | |

OTHER PUBLICATIONS

International Search Report and Written Opinion for International Application No. PCT/CN2023/077735, dated May 15, 2023, ISA/CN.

(Continued)

*Primary Examiner* — Hina F Ayub
(74) *Attorney, Agent, or Firm* — ArentFox Schiff LLP

(57) ABSTRACT

A Raman spectroscopy probe and a Raman spectroscopy detection device are provided including an optical fiber module, and a magnifying lens group and a detection window sequentially arranged on an optical path thereof, wherein the optical fiber module includes an excitation fiber and parallel collection fibers surrounding a periphery thereof; the magnifying lens group includes sequentially-arranged convex lenses, the detection window is located near an object-distance position of a lens close to a detection end. A distance between two adjacent convex lenses is equal to a sum of former's image and latter's object distance. Focal lengths of the convex lenses in the magnifying lens group are f, and satisfy a ratio of the object distance to the image distance of n:1, and a length L of the magnifying lens group satisfies:

(Continued)

$$L = \frac{n+2+\frac{1}{n}}{\log_{10} n} \cdot f \cdot \log_{10} N,$$

wherein $$n = \sqrt[m]{N},$$

N is a magnification, and m is a number of the convex lenses.

20 Claims, 2 Drawing Sheets

(56) References Cited

U.S. PATENT DOCUMENTS

| | | | |
|---|---|---|---|
| 2003/0191398 A1 | 10/2003 | Motz et al. | |
| 2022/0269005 A1* | 8/2022 | Marple | G02B 6/266 |
| 2023/0266166 A1* | 8/2023 | Nagashima | G02F 1/365 |
| | | | 250/504 R |

FOREIGN PATENT DOCUMENTS

| | | |
|---|---|---|
| CN | 103196889 A | 7/2013 |
| CN | 103278919 A | 9/2013 |
| CN | 103837235 A | 6/2014 |
| CN | 103969837 A | 8/2014 |
| CN | 104390952 A | 3/2015 |
| CN | 105352934 A | 2/2016 |
| CN | 105997000 A | 10/2016 |
| CN | 106880338 A | 6/2017 |
| CN | 108037310 A | 5/2018 |
| CN | 108072642 A | 5/2018 |
| CN | 209460144 U | 10/2019 |
| CN | 112075913 A | 12/2020 |
| CN | 114732371 A | 7/2022 |
| EP | 0590268 A1 | 4/1994 |
| EP | 1953536 A1 | 8/2008 |

OTHER PUBLICATIONS

Search Report for Chinese Patent Application No. 202210659104.8 dated Jul. 15, 2022, Chinese Patent Office.

Notification to Grant for Chinese Patent Application No. 202210659104.8, dated Jul. 26, 2022, Chinese Patent Office.

* cited by examiner

RAMAN SPECTROSCOPY PROBE AND RAMAN SPECTROSCOPY DETECTION DEVICE

CROSS-REFERENCE TO RELATED APPLICATIONS

This application is a 371 U.S. national stage of PCT/CN2023/077735, filed Feb. 22, 2023, which claims the benefit of priority from Chinese Patent Application No. 202210659104.8 filed Jun. 13, 2022, the contents of each of which are incorporated herein by reference.

TECHNICAL FIELD

The present disclosure relates to the technical field of medical devices, and particularly, to a Raman spectroscopy probe and a Raman spectroscopy detection device.

BACKGROUND ART

The non-invasive diagnosis of tumors is a current frontier issue in the field of cancer research. Raman spectroscopy is a new type of optical diagnostic technology, has a peak frequency closely related to the molecular structure, and may be used to analyze the molecular composition and content in tumor tissues, and realize high-precision diagnosis by collecting the "Raman fingerprint" of tumors. Among them, the hand-held Raman spectroscopy probe has more clinical application prospects than the confocal scanning Raman microscope, because of its portability and flexibility.

However, the focusing position of the existing hand-held Raman spectroscopy probe is non-contact, that is, there is a certain distance between the position to be measured and the probe. Once the focusing is not good during measurement, the Raman signal will be significantly reduced due to energy dispersion, which will affect the sensitivity of the test result and peak intensity. Unlike the laboratory environment in which the probe may be fixed and clamped by using tools such as iron stands, in the clinical application scenario, in order to cope with the surgical environment with variable depth and angle, the operator needs to hold the Raman spectroscopy probe by a hand for a flexible measurement, which may inevitably make it difficult to achieve the ideal focusing state due to the shaking of the operator's hand, and the reliability, repeatability, and stability of the obtained Raman signals are all questionable, which may lead to a bottleneck of the hand-held Raman spectroscopy probe in the application of in-vivo real-time tumor detection.

SUMMARY

A purpose of the embodiments of the present disclosure is to provide a Raman spectroscopy probe and a Raman spectroscopy detection device, which enable a target object to be located just at the best focusing position of an excitation fiber to improve the reliability and stability of Raman signals, and have good portability.

In an aspect of the embodiments of the present disclosure, a Raman spectroscopy probe is provided, including an optical fiber module, and a magnifying lens group and a detection window that are arranged on an optical path of the optical fiber module in sequence, wherein the optical fiber module includes an excitation fiber (excitation optical fiber), and a plurality of collection fibers (collection optical fibers) arranged in parallel and surrounding a periphery of a fiber core of the excitation fiber, the detection window is located near a position of an object distance of a lens, close to a detection end, in the magnifying lens group; the magnifying lens group includes a plurality of convex lenses that are arranged in sequence, and a distance between two adjacent convex lenses is equal to a sum of an image distance of a former convex lens and an object distance of a latter convex lens; focal lengths of the plurality of convex lenses in the magnifying lens group are each f, and satisfy a ratio of the object distance to the image distance of n:1, and a length L of the magnifying lens group satisfies:

$$L = \frac{n+2+\frac{1}{n}}{\log_{10}n} \cdot f \cdot \log_{10}N,$$

wherein $$n = \sqrt[m]{N},$$

N represents a magnification, m represents a number of the convex lenses, m represents a natural number that is not 0; n represents an independent variable, L represents a dependent variable, f and $\log_{10}$ N represent fixed constants, n represents a positive integer root of N, n represents a positive solution of equation ln $$n - \frac{2}{n-1} - 1 = 0,$$

an obtained ideal value of $m_{ideal}$ is $\log_n N$, and $m=[m_{ideal}]$.

Optionally, relative positions of the plurality of convex lenses may be adjusted by nuts that are provided outside, so that the distances between the plurality of convex lenses are kept equal and the distances are variable, the distances between the plurality of convex lenses are fed back to a computer by an electronic caliper; wherein a distance between the convex lens close to the optical fiber module and an outlet of the excitation fiber is u, wherein u represents a positive solution of the following equation: $u^2-Su+Sf_m=0$, wherein S represents a fixed distance from the outlet of the excitation fiber to an outer surface of the detection window, $f_m$ represents an equivalent focal length of a combination of m convex lenses, $f_m \leq S/4$ and satisfies:

$$\frac{1}{f_m} = \left(\frac{1}{f} - \frac{1}{l}\right)\left(1 - \frac{l}{f}\right)^{m-1} + \frac{1}{l},$$

wherein l represents a distance between adjacent convex lenses, f represents a focal length of each of the convex lenses; and the distance l between the plurality of convex lenses is read by the electronic caliper in real time, and the distance u between the convex lens close to the optical fiber module and the excitation fiber is calculated theoretically in real time by the computer according to the two formulas as above, and is compared with the distance l, until an actual value of the distance l is adjusted to u±σ, wherein σ does not exceed 1% of u.

Optionally, cross sections of the plurality of collection fibers provided surrounding the excitation fiber forms multiple layers of concentric hexagons, and the excitation fiber is located at a center of the hexagons.

Optionally, the plurality of collection fibers surrounds the periphery of the excitation fiber to form the multiple layers, each of the layers is formed as a hexagonal structure, and the optical fiber module is configured to form an optical fiber structure of honeycomb-arrangement-type, as a whole.

Optionally, radial sections of the excitation fiber and the collection fibers are circles or arbitrary regular polygons.

Optionally, the excitation fiber may be connected to a 785 nm laser generator, and the plurality of collection fibers may be converged and connected to the Raman spectrometer.

Optionally, a light outlet end of the excitation fiber is provided with a circular bandpass filter, and a bandwidth of the circular bandpass filter is 5 nm, which allows a light beam with a central wavelength of 785 nm to pass therethrough; light inlet ends of the collection fibers are provided with annular long-pass filters to cover the plurality of collection fibers, and the annular long-pass filters form a nested structure with the circular bandpass filter, to allow a light beam with a light beam range of 200 $cm^{-1}$ to 3500 $cm^{-1}$ to pass therethrough.

Optionally, the light outlet end of the excitation fiber is an end of the excitation fiber that is close to the magnifying lens group, and the light inlet ends of the collection fibers are ends of the collection fibers that are close to the magnifying lens group.

Optionally, an optical fiber protective layer is sleeved over the excitation fiber, the collection fibers, and/or the optical fiber module.

Optionally, the detection window is a glass made of calcium fluoride.

Optionally, the excitation fiber is configured for transmitting the excitation light out, and the collection fibers are configured for transmitting returned detection signals of the detection end.

Optionally, a light beam formed by the detection signals of the detection end forms a diffuse reflection when returning to the collection fibers.

Optionally, radial dimensions of the excitation fiber and the collection fibers may be equal.

Optionally, the magnifying lens group may be configured for magnifying excitation light signals transmitted out by the excitation fiber; and the detection window is configured for contacting directly with a target object.

In another aspect of the embodiments of the present disclosure, a Raman spectroscopy detection device is provided, including the Raman spectroscopy probe as mentioned above and a detector, wherein the detector is connected to the light outlet ends of the collection fibers of the Raman spectroscopy probe.

The embodiments of the present disclosure provide a Raman spectroscopy probe and a Raman spectroscopy detection device. The excitation light is emitted from the excitation fiber, precisely focused by the magnifying lens group onto the target object through the detection window. Subsequently, the light beam scattered back, carrying crucial information about the target object, retraces its path through the detection window. After that, it passes through the magnifying lens group and enters the collection fibers, culminating in the completion of the diagnostic process. Through the magnifying effect of the magnifying lens group, the convergence of the excitation light is realized, thereby increasing the power of the excitation light per unit area, and further improving the sensitivity of Raman detection. Moreover, the detection window is provided near a position of the object distance of the lens in the magnifying lens group close to the detection end, the detection window abuts with the target object. In this way, not only the measurement distance is fixed, but also the target object is enabled to be located just at the best focusing position of the excitation light beam, which solves the problems of inaccurate focusing position and poor measurement result stability and repeatability often caused by hand shaking during a hand-held measurement by an existing hand-held Raman spectroscopy probe. Meanwhile, the present disclosure realizes high-magnification focus by providing the detection window near the position of the object distance of the lens in the magnifying lens group that is close to the detection end, and the excitation light of high-magnification focus reaches the focusing effect of the microscope objective lens, which makes the sensitivity and spatial resolution thereof at objective lens end reach the extent comparable to those of the confocal scanning Raman microscope. Meanwhile, the mode that a plurality of the convex lenses of the magnifying lens group are used in combination may greatly reduce the light spot after the laser convergence, thereby improving the power density of the excitation light and the measurement spatial resolution; and achieve the high-precision focusing during the contact measurement, in combination with that the detection window is fixed at the object distance of the last convex lens. The above two points enable the hand-held Raman probe to reach the power density and the measurement spatial resolution similar to those of the confocal Raman microscope, and to also have portability. As a hand-held probe, the Raman spectroscopy probe is portable and flexible to adapt to a wide range of application scenarios.

BRIEF DESCRIPTION OF DRAWINGS

In order to illustrate the technical solutions in the embodiments of the present disclosure more clearly, the drawings that need to be used in the embodiments of the present disclosure are briefly introduced as follows. It should be understood that the drawings below only show some embodiments of the present disclosure and thus should not be considered as limiting on the scope. For those skilled in the art, other related drawings can also be obtained according to these drawings without making creative efforts.

Reference signs: 101—excitation fiber; 102—collection fiber; 103—optical fiber protective layer; 104—magnifying lens group; 1041, 1042—convex lens; 105—detection window.

DETAILED DESCRIPTION OF EMBODIMENTS

The technical solutions of the embodiments of the present disclosure are clearly and completely described below in conjunction with the figures of the embodiments of the present disclosure.

In the description of the present disclosure, it should be noted that the orientations or positional relationships indicated by terms such as "inside" and "outside" are based on the orientations or positional relationships shown in the figures, or the orientations or positional relationships that the product of the present disclosure is usually placed when in use, only for the convenience of describing the present disclosure and simplifying the description, rather than indicating or implying that the device or element referred to must have a specific orientation, be constructed and operated in a specific orientation. Therefore, it may not be interpreted as a limit on this present disclosure. In addition, the terms "first", "second", etc. are only used for distinguishing descriptions, and should not be interpreted as indicating or implying importance in relativity.

It should also be noted that, unless otherwise clearly specified and limited, the terms "provide" and "connect" should be understood in a broad sense. For example, it may be a fixed connection, a detachable connection, or an integral connection. It may be direct connection, or indirect connection through an intermediary, or may be internal connection between two components. Those of ordinary skill in the art may understand the specific meanings of the above terms in the present disclosure in specific situations.

Figure 1:
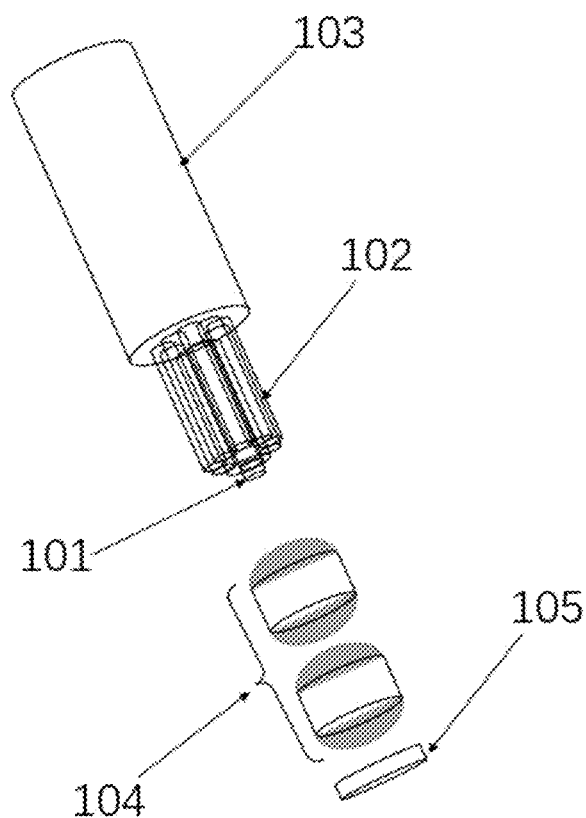
FIG. 1 is a schematic structural diagram of a Raman spectroscopy probe provided by embodiments.

The embodiments of the present disclosure provide a Raman spectroscopy probe which may be applied to disease diagnosis. As shown in FIG. 1, the Raman spectroscopy probe provided by the embodiments of the present disclosure includes an optical fiber module, and a magnifying lens group 104, and a detection window that are arranged on an optical path of the optical fiber module in sequence. The optical fiber module includes an excitation fiber 101, and a plurality of collection fibers 102 arranged in parallel and surrounding a periphery of a fiber core of the excitation fiber 101. The detection window is located near a position of an object distance of a lens in the magnifying lens group 104 that is close to a detection end. The magnifying lens group 104 includes a plurality of convex lenses that are arranged in sequence, and a distance between two adjacent convex lenses is equal to a sum of an image distance of the former convex lens and an object distance of the latter convex lens. Focal lengths of the plurality of the convex lenses in the magnifying lens group 104 are each f, and satisfy a ratio of the object distance to the image distance of n:1, and a length L of the optical path of the magnifying lens group 104 satisfies:

$$L = \frac{n+2+\frac{1}{n}}{\log_{10} n} \cdot f \cdot \log_{10} N; \quad (1)$$

where $$n = \sqrt[m]{N},$$

N represents a magnification, m represents a number of the convex lenses, m represents a natural number that is not 0; n represents an independent variable, L represents a dependent variable, f and $\log_{10} N$ are fixed constants, n represents a positive integer root of N, n represents a positive solution of equation ln $$n - \frac{2}{n-1} - 1 = 0,$$

an obtained ideal value of $m_{ideal}$ is $\log_n N$, and $m=[m_{ideal}]$.

The optical fiber module includes an excitation fiber 101 and a plurality of the collection fibers 102, wherein the plurality of the collection fibers 102 surround the periphery of the fiber core of the excitation fiber 101, and the plurality of the collection fibers 102 are parallel to the excitation fiber 101. The excitation fiber 101 is configured for transmitting an excitation light out, and the collection fibers 102 is configured for transmitting the returned detection signals of the detection end. It should be noted that a light beam formed by the detection signals of the detection end forms diffuse reflection when returning to the plurality of the collection fibers 102, so that the light beam formed by the detection signals may be transmitted to return in a scattering state in order to be received by the plurality of the collection fibers 102. The excitation fiber 101 is connected to a 785 nm laser generator, and the plurality of the collection fibers 102 are assembled and connected to a Raman spectrometer.

Figure 2:
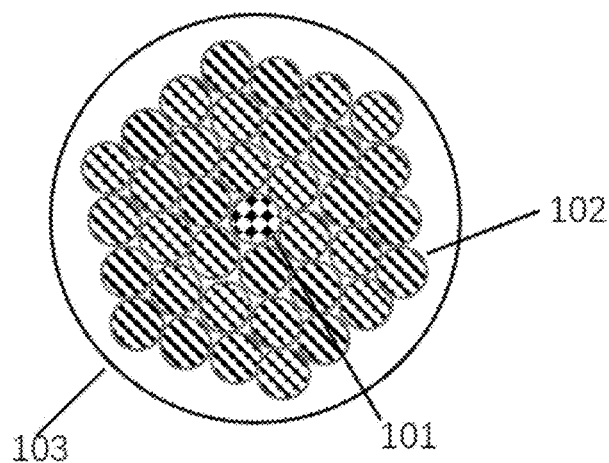
FIG. 2 is a schematic structural diagram of a radial section of an optical fiber module of the Raman spectroscopy probe provided by embodiments.

Optionally, as shown in FIG. 2, cross sections of the plurality of collection fibers 102 provided surrounding the excitation fiber 101 forms multiple layers of concentric hexagons, and the excitation fiber 101 is located at a center of the hexagon.

A cross section of the optical fiber module, formed by the plurality of the collection fibers 102 and the excitation fiber 101 located at the center, is of multiple layers of concentric hexagons, and the excitation fiber 101 is located at the center of the multiple layers of hexagons. The plurality of the collection fibers 102 surround the periphery of the excitation fiber 101 to form the multiple layers, each of the layers is formed as a hexagonal structure, and the optical fiber module is configured to form an optical fiber structure of honeycomb-arrangement-type, as a whole. In this way, collection angles occupied by cross sectional planes of the plurality of collection fibers 102 in the hexagonal structures may be utilized to the greatest extent, so as to improve the efficiency of the collection fibers 102 in collecting the Raman signals, thereby improving the detection sensitivity of the Raman spectroscopy probe.

In addition, radial sections of the excitation fiber 101 and the collection fibers 102 are circles or arbitrary regular polygons, and radial dimensions of the excitation fiber 101 and the collection fibers 102 are equal. The key of the an optical fiber structure of honeycomb-arrangement-type is that the collection fibers 102 surround the excitation fiber 101 in a multilayer regular hexagonal sphere packing arrangement, in which the cross-sectional shape of each optical fiber of the excitation fiber 101 and collection fibers 102 may be a circle or arbitrary regular polygon, which can achieve the technical effect that the optical fiber module maximally uses the area in the collection planes of the multiple layers of hexagons to achieve maximal collection efficiency.

No matter what shape the radial sections of the excitation fiber 101 and the collection fibers 102 may be used, the shapes of the radial sections of the excitation fiber 101 and the collection fibers 102 should be the same. For example, in an embodiment of the present disclosure, the optical fiber module uses the excitation fiber 101 and the collection fibers 102 each having a diameter of 200 μm and a circular section. Of course, other sectional shapes may also be used, which are not limited to the circular sections. For example, the radial sections of the excitation fiber 101 and the collection fibers 102 may be all regular hexagons, and so on, which will be not repeated herein.

In an implementation of the present disclosure, a light outlet end of the excitation fiber 101 may further be provided with a circular bandpass filter, and a bandwidth of the circular bandpass filter is 5 nm, which allows a light beam with a central wavelength of 785 nm to pass therethrough, in order to suppress stray light, which may improve the penetration of the excitation light transmitted out by the excitation fiber 101 as much as possible, so as to make it suitable for scenes of large-angle incidence. The spectrum in the bandpass is flat, the stop band isolation is good, and the wavelength positioning is accurate.

Light inlet ends of the collection fibers 102 may be provided with long-pass filters, the long-pass filters have characteristic of high transmittance in the pass band and high suppression in the stop band, and may achieve fast transition, thereby realizing excellent spectral isolation in the required wavelength range.

In the above, since there are a plurality of the collection fibers 102, the light inlet end of each of the collection fibers 102 may be provided with an annular long-pass filter, or the plurality of the collection fibers 102 may share one annular long-pass filter, and at this time, the annular long-pass filter is formed as being in an annular shape with a through hole at the center, wherein the through hole at the center avoids the excitation fiber 101, and the annular area may be shared by the plurality of collection fibers 102. In other words, the annular long-pass filter may cover all collection fibers 102, and the annular long-pass filter further forms a nested structure with the circular bandpass filter, which allows a light beam with a light beam range of 200 $cm^{-1}$-3500 $cm^{-1}$ to pass therethrough.

The light outlet end of the above-mentioned excitation fiber 101 refers to the end of the excitation fiber 101 close to the magnifying lens group 104, and the light inlet ends of the collection fibers 102 refer to the ends of the collection fibers 102 close to the magnifying lens group 104.

An optical fiber protective layer 103 is sleeved over the excitation fiber 101, the collection fibers 102, and/or the optical fiber module, wherein an optical fiber protective layer 103 is sleeved over the whole optical fiber module formed by the excitation fiber 101 and the plurality of collection fibers 102, to protect the whole optical fiber module; an optical fiber protective layer 103 is sleeved over each of the collection fibers 102 and the excitation fiber 101 also to protect a single fiber. For the two arrangements of an optical fiber protective layer 103 being sleeved over the whole optical fiber module and an optical fiber protective layer 103 being sleeved over each fiber, one or two of them may be used according to specific needs, wherein the protection effect on the optical fibers may be doubled when the two of them are used.

In another aspect, the magnifying lens group 104 and the detection window 105 are provided on the optical path of the optical fiber module in sequence, and the magnifying lens group 104 is configured for magnifying the excitation light signals transmitted out by the excitation fiber 101, to improve excitation energy density. The detection window 105 is configured for contacting directly with a target object and controlling the focusing distance. The detection window 105 is located near the position of the object distance of the lens, close to the detection end, in the magnifying lens group 104. In other words, the detection window 105, of which an object-side surface is just located at an object-side focal plane of the magnifying lens group 104, is used in the present disclosure, wherein the object-side surface of the detection window 105 abuts with the target object for measurement, to enable the target object to be located at the best focusing position of the excitation light beam while fixing the measurement distance, so as to improve the focus accuracy of the Raman spectroscopy probe provided in the embodiments of the present disclosure.

Furthermore, the detection window 105 is a glass made of calcium fluoride, and a common glass or quartz is not used as the detection window 105 in order to avoid interference to the Raman signals brought by strong fluorescence background signals generated by the excitation light focusing. The detection window 105 is made of calcium fluoride, because the laser is focused on the outer surface of the detection window 105 and the surface of the target object at the same time and it is necessary to avoid the background interference of Raman signals caused by the material of the detection window 105 itself.

The glass of which one object-side surface is located at the object-side focal plane of the magnifying lens group 104 may be used to control the measurement distance and also have a function of antifouling. Those skilled in the art may also use a shell of a cavity structure to replace the glass, thus realizing the function of controlling the measurement distance, or further provide an antifouling coating on the glass to realize the function of antifouling.

The working principle of the Raman spectroscopy probe provided by the embodiments of the present disclosure is that: the end of the excitation fiber 101 close to the magnifying lens group 104 is the light outlet end, wherein the excitation light is transmitted out by the excitation fiber 101 from its light outlet end to the magnifying lens group 104, and then transmitted out to the target object through the detection window 105; and the ends of the collection fibers 102 close to the magnifying lens group 104 are the light inlet ends, and the ends thereof away from the magnifying lens group 104 are light outlet ends, wherein the returning light beam carrying the information of the target object returns to the collection fibers 102 by the light inlet ends of the collection fibers 102 after passing through the detection window 105 and the magnifying lens group 104, and transmitted out from the light outlet ends of the collection fibers 102, to complete the detection of the target object.

When using the Raman spectroscopy probe provided by the embodiments of the present disclosure, the excitation light signals are transmitted out by the excitation fiber 101, magnified by the magnifying lens group 104, and then transmitted to the target object through the detection window 105 for detection, then the returning light beam carrying the information of the target object returns to the collection fibers 102 after passing through the detection window 105 and the magnifying lens group 104 in sequence, and the detected information of the target object may be obtained by feedbacks of the collection fibers, completing the detection diagnosis. In the above, when the returning light beam returns to the collection fibers 102, the returning light beam, in a scattering state due to the diffuse reflection, is incident into the plurality of collection fibers 102 respectively, to be received by the plurality of collection fibers 102.

Figure 3:
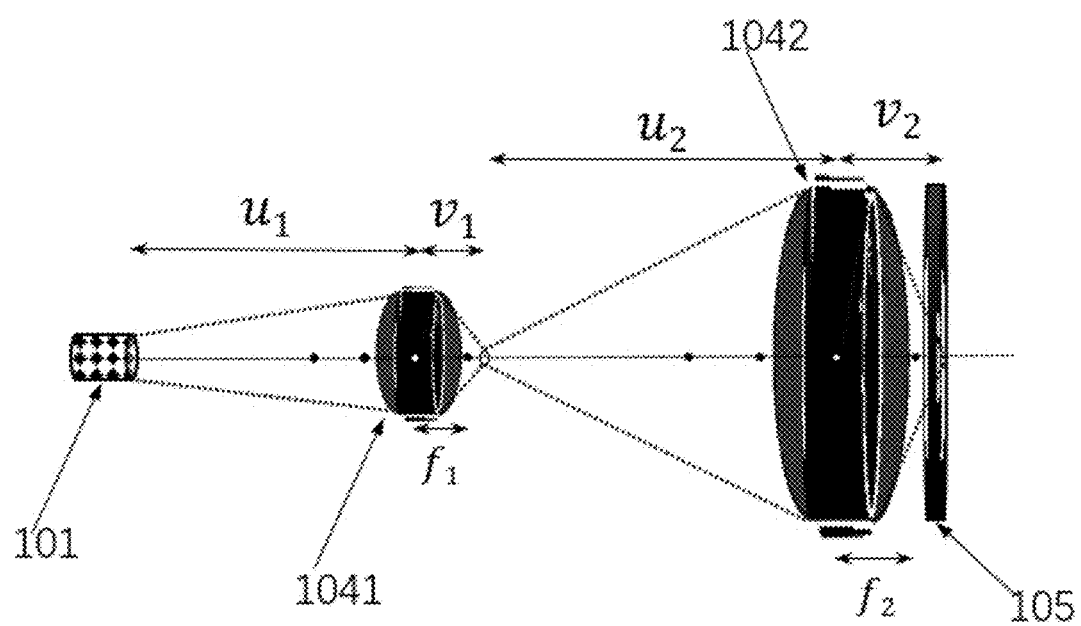
FIG. 3 is a schematic structural diagram of a magnifying lens group of the Raman spectroscopy probe provided by embodiments.

Further, referring to what is shown in FIG. 3, the magnifying lens group 104 includes a plurality of convex lenses that are provided in sequence, and the distance between two adjacent convex lenses is equal to the sum of the image distance of the former convex lens and the object distance of the latter lens.

The plurality of convex lenses form the magnifying lens group 104, the plurality of the convex lenses are provided in sequence, and the distance between two adjacent convex lenses is equal to the sum of the image distance of the former convex lens and the object distance of the latter lens. In other words, in the plurality of the convex lenses, the image of the former convex lens is the object of the latter convex lens.

In addition, the focal lengths of the plurality of the convex lenses of the magnifying lens group 104 are each f, and satisfy a ratio of the object distance to the image distance of n:1, and the optical path length L of the magnifying lens group 104 satisfies:

$$L = \frac{n+2+\frac{1}{n}}{\log_{10} n} \cdot f \cdot \log_{10} N; \qquad (1)$$

where $$n = \sqrt[m]{N},$$

N represents the magnification, m represents the number of the convex lenses, and m represents a natural number that is not 0.

In the above-mentioned formula (1), n represents the independent variable, L represents the dependent variable, and f and $\log_{10} N$ are fixed constants for the design to be realized. In order to make the structure more compact, the minimum value of L needs to be obtained, and n is required to be only the positive integer root of N. The best value of n under ideal conditions is a positive solution of the equation of ln $$n - \frac{2}{n-1} - 1 = 0,$$

and the resulted ideal value of $m_{ideal}$ is $\log_n N$. In the actual design process, the closest positive integers around $m_{ideal}$ are taken as the best m values, and usually, considering the design complexity and cost, the smaller positive integer is taken as the m value, that is, $[m_{ideal}]$.

The mode that a plurality of the convex lenses of the magnifying lens group 104 are used in combination may greatly reduce the light spot after the laser is converged, thereby improving the power density of the excitation light and measurement spatial resolution, and realize high-precision focusing during the contact measurement, in conjunction with that the detection window is fixed near the position of the object distance of the last convex lens. The above two points enable the hand-held Raman probe to achieve the power density of the excitation light and the measurement spatial resolution similar to those of a confocal Raman microscope, and to also have portability.

A preferred function is proposed for the magnification selection of the plurality of the convex lenses, as follows.

For a given total magnification N to be realized, if the mode of combining m convex lenses each having a focal length off and a ratio of the object distance to the image distance of n:1 is used, the length of the whole optical path is L, satisfying:

$$L = \left[(n+1)f + \frac{n+1}{n}f\right]m; \qquad (2)$$

$$n^m = N; \qquad (3)$$

Formula (1) may be obtained by substituting formula (3) into formula (2).

In the above, n represents the independent variable, L represents the dependent variable, and f and $\log_{10} N$ are fixed constants for the design to be realized. In order to make the structure more compact, the minimum value of L needs to be obtained, and n is required to only be the positive integer root of N, that is:

$$n = \sqrt[m]{N}; \qquad (4)$$

the best value of n under ideal conditions is positive solution of equation ln $$n - \frac{2}{n-1} - 1 = 0, \qquad (5)$$

and the ideal value of $m_{ideal}$ is $\log_n N$. In the actual design process, the closest positive integers around $m_{ideal}$ are taken as the best m values, and usually, considering the design complexity and cost, the smaller positive integer is taken as the m value, that is, $[m_{ideal}]$.

For example, when the Raman spectroscopy probe provided by the embodiments of the present disclosure needs to enable the magnifying lens group 104 to realize the magnification of N=49 times:

when m=1, n=49, L=51.02f;
when m=2, n=7, L=18.28f;
when m=3, n=3.66, L=17.80f; and
when m=4, n=2.65, L=20.11f.

If continuous values are taken as n and the minimum value is obtained when n=4.6, it may be known that m=3 is the theoretically best value. However, there is not much difference between L=18.28f and L=17.80f, but one less convex lens may be used, so considering from the perspectives of cost and optical path debugging complexity, the scheme of m=2, n=7, that is, the scheme of combining two convex lenses with a magnification of 7, is selected.

Therefore, according to the formulas (1) and (4) and the selected scheme, the present disclosure may confirm the magnification expanding range and illustrate the preferred scheme of the magnifying lens group 104.

In summary, in the Raman spectroscopy probe provided by the embodiments of the present disclosure, the excitation light is transmitted out by the excitation fiber 101, magnified by the magnifying lens group 104, and then incident on the target object through the detection window 105, and then, the returning light beam carrying the information of the target object turns back through the detection window 105, and is in a scattering state after passing through the magnifying lens group and then transmitted to return to the collection fibers 102, so as to complete the detection diagnosis. Through the magnifying effect of the magnifying lens group 104, the convergence of the excitation light is realized, thereby increasing the power of the excitation light per unit area, and further improving the sensitivity of Raman detection. Moreover, the detection window 105 is provided near a position of the object distance of the lens, close to the detection end, in the magnifying lens group 104, the detection window 105 abuts with the target object, so that the light spot convergence point is located on the outer surface of the detection window 105. In this way, not only the measurement distance is fixed, but also the target object is enabled to be located in the best focusing position of the excitation light beam, which solves the problems of inaccurate focusing position and poor measurement result stability and repeatability often caused by hand shaking during a hand-held measurement by an existing hand-held Raman spectroscopy probe. Meanwhile, the present disclosure realizes high-magnification focus by providing the detection window 105 near the position of the object distance of the lens, close to the detection end, in the magnifying lens group 104, and the excitation light of high-magnification focus reaches the focusing effect of the microscope objective lens, which makes the sensitivity and spatial resolution thereof at objective lens end reach the extent comparable to those of the confocal scanning Raman microscope. Meanwhile, the mode that a plurality of the convex lenses of the magnifying lens group 104 are used in combination may greatly reduce the light spot after the laser convergence, thereby increasing the power density of the excitation light and the measurement spatial resolution; and achieve the high-precision focusing during the contact measurement, in combination with that the detection window 105 is fixed near the position of the object distance of the last convex lens. The above two points enable the hand-held Raman probe to reach the power density and the measurement spatial resolution similar to those of the confocal Raman microscope, and to also have portability. As a hand-held probe, the Raman spectroscopy probe is portable and flexible to adapt to a wide range of application scenarios.

Optionally, relative positions of the plurality of the convex lenses may be adjusted by nuts that are provided outside, so that the distances between the plurality of the convex lenses are always equal and the distances are variable, the distances between the plurality of the convex lenses are read by an electronic caliper in real time, and then sent to a computer. However, the convergence position of the final light spot does not change, which is the outer surface of the detection window 105, and the distance between the convex lens that is close to the optical fiber module and the outlet of the excitation fiber 101 is required to be u, where u is a positive solution of the following equation:

$$u^2 - Su + Sf_m = 0 \quad (6);$$

The equation is obtained from $$\frac{1}{u} + \frac{1}{v} = \frac{1}{f_m}$$

and u+v=S, (v is the equivalent image distance of the magnifying lens group 104), where the equation has at least one solution when S represents the fixed distance from the outlet of the excitation fiber 101 to the outer surface of the detection window 105, $f_m$ represents an equivalent focal length of a combination of m convex lenses, and $f_m \leq S/4$, and the formula according to the equivalent focal length of the combination of convex lenses satisfies:

$$f_m = \frac{f_{m-1} \cdot f}{f_{m-1} + f - l};$$

that is, $\frac{1}{f_m} = \frac{1}{f} + \frac{1}{f_{m-1}}\left(1 - \frac{l}{f}\right);$ that is, $\frac{1}{f_m} - \frac{1}{l} = \left(1 - \frac{l}{f}\right)\left(\frac{1}{f_{m-1}} - \frac{1}{l}\right);$ then, $$\frac{1}{f_m} - \frac{1}{l}$$

is a geometric sequence in which the first item is $$\left(\frac{1}{f} - \frac{1}{l}\right),$$

and the common ratio is $$\left(1 - \frac{l}{f}\right),$$

then:

$$\frac{1}{f_m} = \left(\frac{1}{f} - \frac{1}{l}\right)\left(1 - \frac{l}{f}\right)^{m-1} + \frac{1}{l}, \quad (7)$$

where l represents the distance between adjacent convex lenses (the central distance), and f represents the focal length of each of the convex lenses.

When the position is adjusted each time, the data of the distance l between the plurality of convex lenses is read by the electronic caliper in real time, and the distance u of the convex lens that is closest to the excitation fiber 101 theoretically is calculated in real time by the computer according to the two formulas as mentioned above, and is compared with the distance l between the plurality of convex lenses read by the electronic caliper in real time, until the actual value of the distance l is adjusted to u±σ, where σ is set according to the pitch machining accuracy, and generally may not exceed 1% of u.

In the spatial optical structure in which the magnifying lens group 104 for multi-stage magnification of the excitation light signal is combined with the contact detection window 105 for focusing, according to the different magnification ratios to be achieved, those skilled in the art may combine different numbers of convex lenses to form the magnifying lens group 104, or select convex lenses with different diameters and focal lengths as required and combine the same to achieve high-magnification focus and light spot reduction. The core technology thereof lies in that the image of each of the convex lenses overlaps, in position, with the object of the next convex lens (i.e. the objects and images of the convex lenses are coupled to each other), thus realizing the multi-stage magnification. Meanwhile, the diameter of the convex lens closer to the target object is larger to improve the utilization of the excitation light.

In an implementation of the present disclosure, in order to realize a focusing magnification of about 50 times, the magnifying lens group 104 may be composed of two convex lenses, namely the convex lens 1041, and the convex lens 1042, respectively.

For example, as shown in FIG. 3, when the outgoing section of the excitation fiber 101 is an object, the ratios of the object distance to the image distance of the convex lens 1041 and the convex lens 1042 are both 7:1. Assuming that the focal lengths of the convex lens 1041 and the convex lens 1042 (in the direction from the excitation fiber 101 to the target object) are f1 and f2 in sequence, then according to the convex lens imaging formula $$\frac{1}{u} + \frac{1}{v} = \frac{1}{f},$$

the object distances of the convex lens 1041 and the convex lens 1042 are u1=8f1, and u2=8f2, respectively, and the image distances of the convex lens 1041 and the convex lens 1042 are v1=8f1/7, and v2=8f2/7, respectively. In the above, the image of the convex lens 1041 is regarded as the object of the convex lens 1042. In this way, the multi-stage magnification, and 49 times magnification focusing are realized, so that the light spot at the focusing position is 1/49 of the outgoing section of the excitation fiber 101, and the excitation energy density is improved.

In summary, the Raman spectroscopy probe provided by the embodiments of the present disclosure is in the spatial optical structure in which the optical fiber structure of honeycomb-arrangement-type and the multi-stage magnifying lens group 104 are combined with the contact detection window 105 for focusing. The optical fiber structure of honeycomb-arrangement-type includes the excitation fiber 101 located at the central position and configured for exporting the excitation light, and collection fibers 102 that surrounds the excitation fiber in a honeycomb hexagon arrangement and configured for transmitting returned Raman scattered light. The excitation fiber 101 and the collection fibers 102 have same diameters, to ensure that the returned Raman optical signals are collected maximally by the optical fibers in honeycomb arrangement. The optical fiber structure of honeycomb-arrangement-type maximizes the collection efficiency, thereby improving the detection sensitivity, The spatial optical structure, where the multi-stage magnifying lens group 104 is combined with the contact detection window 105 to perform focusing, includes the high-magnification-focus magnifying lens group 104 which is composed of a plurality of convex lenses and whose objects and images are coupled to each other, and one detection window 105 of which the object-side surface is located just at the object-side focal plane of the magnifying lens group 104 (the object side here refers to the side where the target object is located, that is, the side pointed by the whole probe). For the detection window of which the object-side surface is located just at the object-side focal plane of the magnifying lens group 104, the object-side surface thereof directly contacts the target object (such as tumor tissues) during the measurement, so as to ensure that the measurement position is just the best focusing position of the excitation light beam, thereby improving the stability and reliability of the measurement results.

The optical fiber structure of honeycomb-arrangement-type used by the present disclosure may use the collection angles occupied by the collection planes to the maximum extent, thereby improving the efficiency of collecting Raman signals, and further improving the sensitivity of Raman detection. The spatial optical structure, where the multi-stage magnifying lens group is combined with the contact detection window 105 to perform focusing, may realize the convergence of the excitation light through the multi-stage magnifying effect of the magnifying lens group 104, so that the excitation light may be converged smaller, thereby increasing the power of the excitation light per unit area, and further improving the sensitivity of Raman detection. For the adopted detection window 105 of which the object-side surface is located just at the object-side focal plane of the lens group, the object-side surface thereof abuts with the target object for measurement, which not only fixes the measurement distance, but also enables the target object to be located just at the best focusing position of the excitation light beam. The detection window 105 is provided as a glass, which plays the role of antifouling, and prolongs the service life and improves long-term performance consistency of the optical elements inside. As a result, the problems of inaccurate focusing position and poor measurement result stability and repeatability often caused by hand shaking during a hand-held measurement by an existing hand-held Raman spectroscopy probe. Meanwhile, the excitation light spot of high-magnification focus reaches the focusing effect of the microscope objective lens, which makes the sensitivity and spatial resolution thereof at objective lens end reach the extent comparable to those of the confocal scanning Raman microscope, without losing its portability and flexibility as a hand-held probe.

In another aspect, the embodiments of the present disclosure further disclose a Raman spectroscopy detection device, including the Raman spectroscopy probe according to any embodiment of the above and a detector, and the detector is connected to the light outlet ends of the collection fibers 102 of the Raman spectroscopy probe.

When the Raman spectroscopy detection device provided by the embodiments of the present disclosure works, an excitation light is transmitted out from the excitation fiber 101 of the Raman spectroscopy probe, and the convergence of the excitation light is realized after the multi-stage magnifying effect of the magnifying lens group 104, which increases the power of the excitation light per unit area, thereby improving the sensitivity of Raman detection. The multi-stage magnified excitation light is transmitted to a target object through the detection window 105, the object-side surface of the detection window 105 is located just at the object-side focal plane of the magnifying lens group 104, the object-side surface of the detection window 105 abuts with the target object for measurement, so that the target object is also located just at the best focusing position of the excitation light beam while the measurement distance is fixed, which enables accurate focusing position and high measurement result stability and repeatability. Then, the target object that receives the excitation light makes the returning light beam carrying its information turn back, and the returning light beam is transmitted to return to the collection fibers after passing through the detection window 105 and the magnifying lens group 104 again. The detector is connected to the light outlet ends of the collection fibers 102, and the collection fibers 102 receive the returning light beam carrying the information of the target object and feed it back to the detector. After the information is being analyzed and processed by the detector, the detection information of the target object may be obtained, so as to complete the detection diagnosis.

The Raman spectroscopy detection device includes the same structures and beneficial effects as the Raman spectroscopy probe in the foregoing embodiments. The structures and beneficial effects of the Raman spectroscopy probe are described in detail in the foregoing embodiments, which will not be repeated here again.

The foregoing are only the embodiments of the present disclosure, which are not intended to limit the protection scope of the present disclosure. For those skilled in the art, the present disclosure may have various modifications and changes. Any modifications, equivalent replacements, improvements, etc. made within the spirit and principles of the present disclosure shall be included within the protection scope of the present disclosure.

INDUSTRIAL APPLICABILITY

The present disclosure provides a Raman spectroscopy probe and a Raman spectroscopy detection device, wherein the excitation light is transmitted out by the excitation fiber, magnified by the magnifying lens group, and then incident on the target object through the detection window, then the returning light beam carrying the information of the target object turns back through the detection window again, and is transmitted to return to the collection fibers, in a scattering state after passing through the magnifying lens group, so as to complete the detection diagnosis. Through the magnifying effect of the magnifying lens group, the convergence of the excitation light is realized, thereby increasing the power of the excitation light per unit area, and further improving the sensitivity of Raman detection. Moreover, the detection window is provided near a position of the object distance of the lens, close to the detection end, in the magnifying lens group, and the detection window abuts with the target object. In this way, not only the measurement distance is fixed, but also the target object is enabled to be located in the best focusing position of the excitation light beam, which solves the problems of inaccurate focusing position and poor measurement result stability and repeatability often caused by hand shaking during a hand-held measurement by an existing hand-held Raman spectroscopy probe. Meanwhile, the present disclosure realizes high-magnification focus by providing the detection window near the position of the object distance of the lens, close to the detection end, in the magnifying lens group, and the excitation light of high-magnification focus reaches the focusing effect of the microscope objective lens, which makes the sensitivity and spatial resolution at objective lens end reach the extent comparable to the confocal scanning Raman microscope. Meanwhile, the mode that a plurality of the convex lenses of the magnifying lens group are used in combination may greatly reduce the light spot after the laser convergence, thereby improving the power density of the excitation light and the measurement of spatial resolution; and achieve the high-precision focusing during the contact measurement, in combination with that the detection window is fixed at the object distance of the last convex lens. The above two points enable the hand-held Raman probe to reach the power density and the measurement spatial resolution similar to those of the confocal Raman microscope, and to also have portability. As a hand-held probe, the Raman spectroscopy probe is portable and flexible to adapt to a wide range of application scenarios.

In addition, it may be understood that the Raman spectroscopy probe and the Raman spectroscopy detection device of the present disclosure are reproducible and may be used in various industrial applications. For example, the Raman spectroscopy probe and Raman spectroscopy detection device of the present disclosure may be used in the technical field of medical devices.

What is claimed is:

1. A Raman spectroscopy probe, comprising an optical fiber module, and a magnifying lens group and a detection window that are arranged on an optical path of the optical fiber module in sequence, wherein the optical fiber module comprises an excitation fiber and a plurality of collection fibers arranged in parallel and surrounding a periphery of a fiber core of the excitation fiber, the detection window is located near a position of an object distance of a lens, close to a detection end, in the magnifying lens group; the magnifying lens group comprises a plurality of convex lenses that are arranged in sequence, and a distance between two adjacent convex lenses is equal to a sum of an image distance of a former convex lens and an object distance of a latter convex lens; focal lengths of the plurality of convex lenses in the magnifying lens group are all f, and all satisfy a ratio of the object distance to the image distance of n:1, and a length L of the magnifying lens group satisfies:

$$L = \frac{n + 2 + \frac{1}{n}}{\log_{10} n} \cdot f \cdot \log_{10} N;$$

wherein $$n = \sqrt[m]{N},$$

is a magnification, m is a number of the convex lenses, m is a natural number that is not 0; n is an independent variable, L is a dependent variable, f and $\log_{10} N$ are fixed constants, n is a positive integer root of N, n is a positive solution of equation ln $$n - \frac{2}{n-1} - 1 = 0,$$

an obtained ideal value of $m_{ideal}$ is $\log_n N$, and $m = [m_{ideal}]$.

2. The Raman spectroscopy probe according to claim 1, wherein relative positions of the plurality of convex lenses are adjusted by nuts that are provided outside, so that distances between the plurality of convex lenses are equal and are variable, the distances between the plurality of convex lenses are fed back to a computer by an electronic caliper in real time; wherein a distance between one of the convex lenses that is close to the optical fiber module and an outlet of the excitation fiber is u, wherein u is a positive solution of a following equation:

$$u^2 - Su + Sf_m = 0;$$

wherein S represents a fixed distance from the outlet of the excitation fiber to an outer surface of the detection window, $f_m$ represents an equivalent focal length of a combination of m convex lenses, $f_m \leq S/4$ and satisfies:

$$\frac{1}{f_m} = \left(\frac{1}{f} - \frac{1}{l}\right)\left(1 - \frac{l}{f}\right)^{m-1} + \frac{1}{l},$$

wherein l represents the distance between adjacent convex lenses, f represents a focal length of each of the convex lenses; and the distance l between the plurality of convex lenses is read by the electronic caliper in real time, and the distance u between the outlet of the excitation fiber and the convex lens close to the optical fiber module theoretically is calculated in real time by the computer according to the two formulas above, and then is compared with the distance l until an actual value of the distance is adjusted to u±σ, wherein σ does not exceed 1% of u.

3. The Raman spectroscopy probe according to claim 2, wherein cross sections of the plurality of collection fibers provided surrounding the excitation fiber form multiple layers of concentric hexagons, and the excitation fiber is located at a center of the hexagons.

4. The Raman spectroscopy probe according to claim 2, wherein a light outlet end of the excitation fiber is provided with a circular bandpass filter, and a bandwidth of the circular bandpass filter is 5 nm, which allows a light beam with a central wavelength of 785 nm to pass therethrough; light inlet ends of the collection fibers are provided with annular long-pass filters to cover the plurality of collection fibers, and the annular long-pass filters form a nested structure with the circular bandpass filter, to allow a light beam with a light beam range of 200 cm$^{-1}$ to 3500 cm$^{-1}$ to pass therethrough.

5. The Raman spectroscopy probe according to claim 2, wherein an optical fiber protective layer is sleeved over the excitation fiber, the collection fibers, and/or the optical fiber module.

6. The Raman spectroscopy probe according to claim 2, wherein radial dimensions of the excitation fiber and the collection fibers are equal.

7. The Raman spectroscopy probe according to claim 2, wherein the magnifying lens group is configured for magnifying excitation light signals transmitted out by the excitation fiber; and the detection window is configured for contacting directly with a to-be-measured object.

8. The Raman spectroscopy probe according to claim 1, wherein cross sections of the plurality of collection fibers provided surrounding the excitation fiber form multiple layers of concentric hexagons, and the excitation fiber is located at a center of the hexagons.

9. The Raman spectroscopy probe according to claim 8, wherein the plurality of collection fibers surround a periphery of the excitation fiber to form the multiple layers, each of which is formed as a hexagonal structure, and the optical fiber module is configured to form an optical fiber structure of honeycomb-arrangement-type, as a whole.

10. The Raman spectroscopy probe according to claim 1, wherein radial sections of the excitation fiber and the collection fibers are circles or arbitrary regular polygons.

11. The Raman spectroscopy probe according to claim 1, wherein the excitation fiber is connected to a 785 nm laser generator, and the plurality of collection fibers are converged and connected to a Raman spectrometer.

12. The Raman spectroscopy probe according to claim 1, wherein a light outlet end of the excitation fiber is provided with a circular bandpass filter, and a bandwidth of the circular bandpass filter is 5 nm, which allows a light beam with a central wavelength of 785 nm to pass therethrough; light inlet ends of the collection fibers are provided with annular long-pass filters to cover the plurality of collection fibers, and the annular long-pass filters form a nested structure with the circular bandpass filter, to allow a light beam with a light beam range of 200 cm$^{-1}$ to 3500 cm$^{-1}$ to pass therethrough.

13. The Raman spectroscopy probe according to claim 12, wherein the light outlet end of the excitation fiber is an end of the excitation fiber that is close to the magnifying lens group, and the light inlet ends of the collection fibers are ends of the collection fibers that are close to the magnifying lens group.

14. The Raman spectroscopy probe according to claim 1, wherein an optical fiber protective layer is sleeved over the excitation fiber, the collection fibers, and/or the optical fiber module.

15. The Raman spectroscopy probe according to claim 1, wherein the detection window is a glass made of calcium fluoride.

16. The Raman spectroscopy probe according to claim 1, wherein the excitation fiber is configured for transmitting the excitation light out, and the collection fibers are configured for transmitting returned detection signals of the detection end.

17. The Raman spectroscopy probe according to claim 16, wherein a light beam formed by the detection signals of the detection end forms a diffuse reflection when returning to the collection fibers.

18. The Raman spectroscopy probe according to claim 1, wherein radial dimensions of the excitation fiber and the collection fibers are equal.

19. The Raman spectroscopy probe according to claim 1, wherein the magnifying lens group is configured for magnifying excitation light signals transmitted out by the excitation fiber; and the detection window is configured for contacting directly with a target object.

20. A Raman spectroscopy detection device, comprising the Raman spectroscopy probe according to claim 1 and a detector, wherein the detector is connected to the light outlet ends of the collection fibers of the Raman spectroscopy probe.

* * * * *